July 14, 1953
M. S. SWANSTROM
2,645,261
SAW FRAME STRUCTURE FOR RELEASABLY
HOLDING AND TENSIONING SAW BLADES
Filed Aug. 4, 1950
2 Sheets-Sheet 2
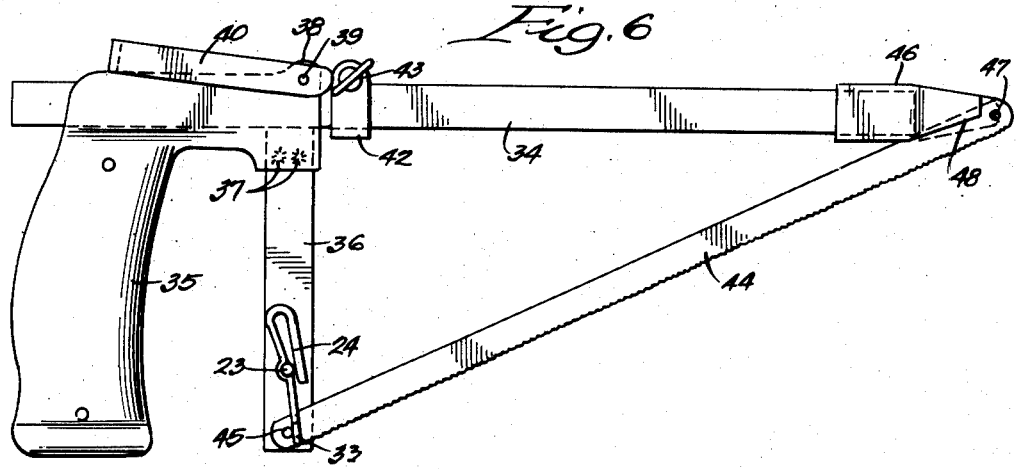
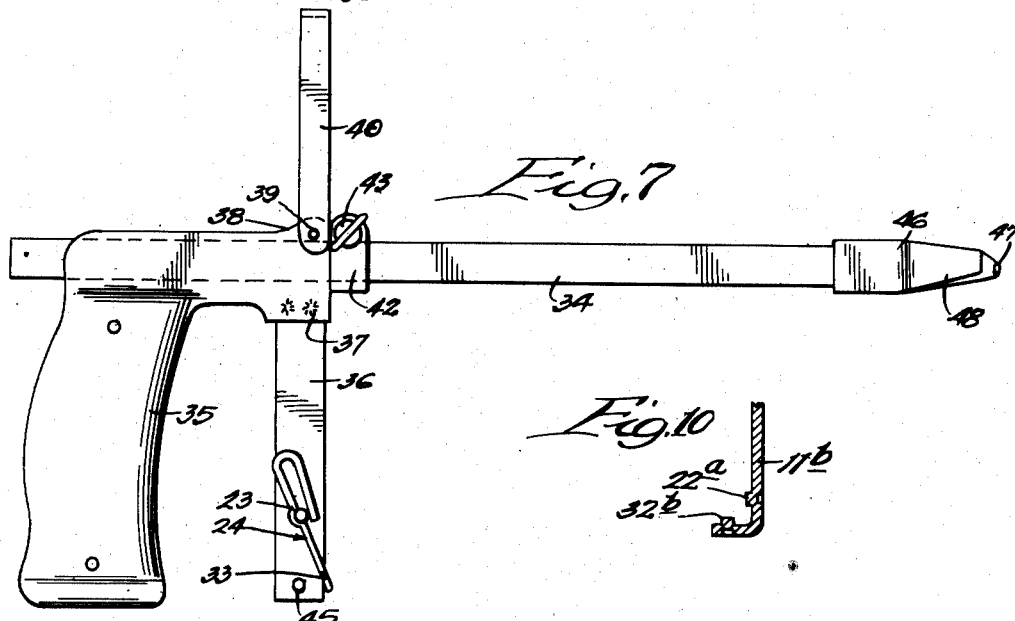
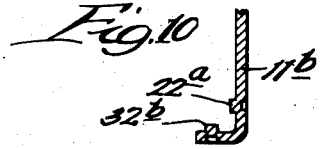
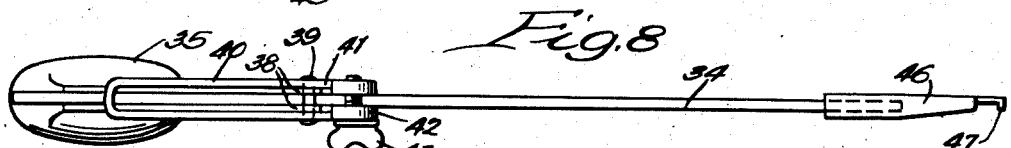
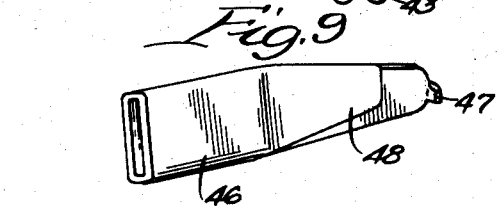
INVENTOR.
Martin S. Swanstrom,
BY
Dawson & Ooms
ATTORNEYS.

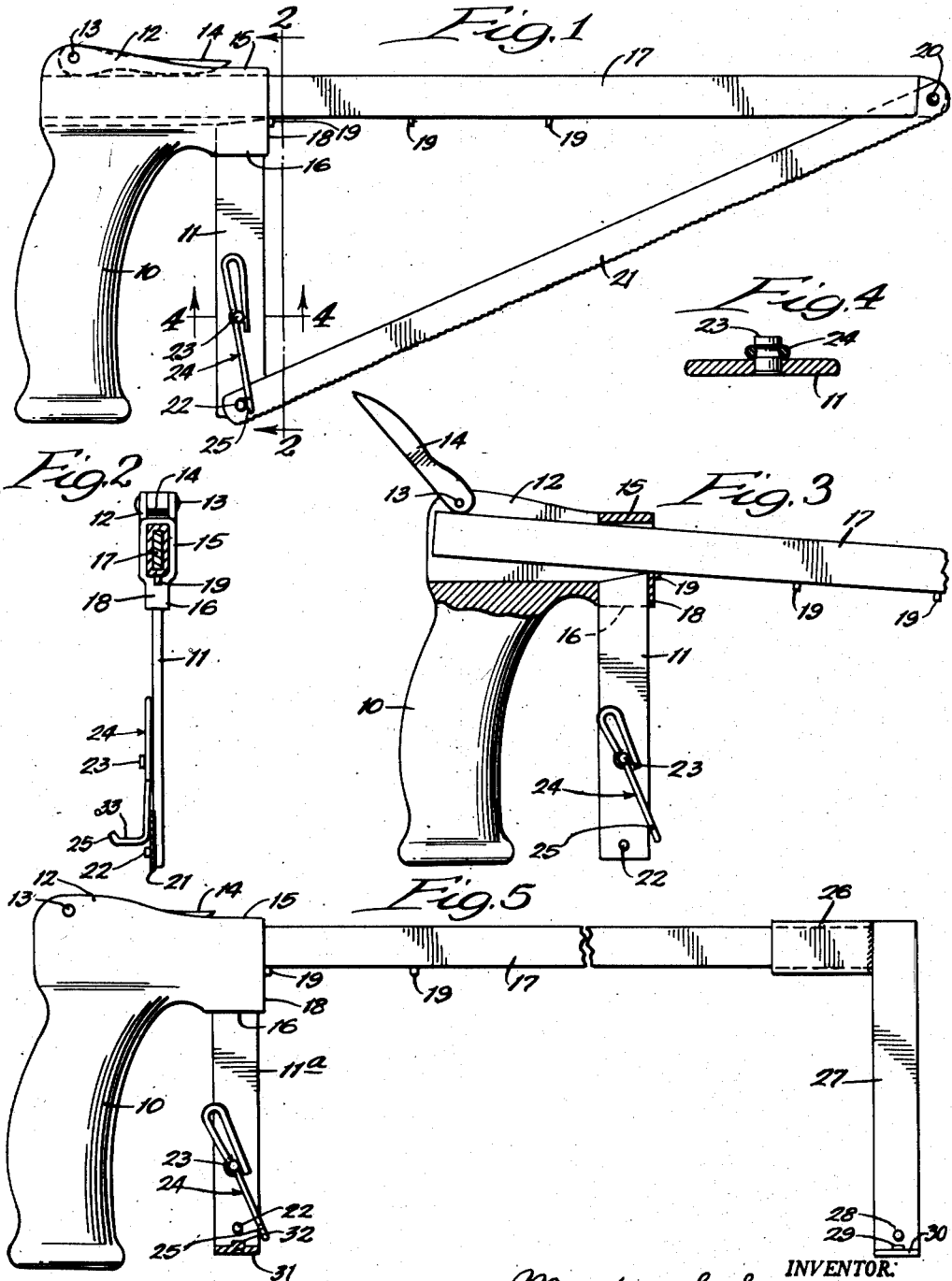

Patented July 14, 1953

2,645,261

UNITED STATES PATENT OFFICE 2,645,261

SAW FRAME STRUCTURE FOR RELEASABLY HOLDING AND TENSIONING SAW BLADES

Martin S. Swanstrom, Chicago, Ill.

Application August 4, 1950, Serial No. 177,730

3 Claims. (Cl. 145—34)

This invention relates to a saw, and more particularly to a saw structure in which the blade may be removed and blades of different lengths may be readily supported therein.

An object of the invention is to provide a saw structure in which blades of different lengths may be releasably secured while at the same time maintaining the blades taut through novel clamping means. A further object is to provide a saw structure in which a releasable blade is retained in flat condition and distortion therein prevented by the use of a keeper or retainer. A still further object is to provide retainer means for maintaining a removable saw blade in flat and non-distorted condition while at the same time permitting blades of different lengths to be releasably supported in the structure. A further object is to provide a saw structure in which a straight or uncut bar or rail may be employed as a support while at the same time providing means for clamping the saw blade in taut condition by a simple movement of a clamp arm. Yet another object is to provide in such a saw structure an end-piece releasably receiving rails of different lengths while providing means for securing the blade against turning movement or distortion. A still further object is to provide a saw frame structure adapted to support the saw blade in different planes while providing single means for retaining the blade in either of the planes in which it is secured. Other specific objects and advantages will appear as the specification proceeds.

The invention is shown, in illustrative embodiments, by the accompanying drawings, in which—

Figure 1 is a side view in elevation of a saw structure embodying my invention; Fig. 2, a sectional detail view, the section being taken as indicated at line 2—2 of Fig. 1; Fig. 3, a broken view in elevation, a portion of the structure being shown in section; Fig. 4, a transverse sectional view on an enlarged scale, the section being taken as indicated at line 4—4 of Fig. 1; Fig. 5, a side view in elevation of a modified structure in which the saw blade may be supported in different planes and with a retainer for supporting the blade in either position; Fig. 6, a side view in elevation of a modified form of the structure embodying my invention; Fig. 7, a view similar to Fig. 6 but showing the structure in released position and with the blade removed; Fig. 8, a top plan view of the structure shown in Fig. 7; Fig. 9, a perspective view of the end-piece employed in the structures shown in Fig. 6 to 8 inclusive; and Fig. 10, a detail sectional view of another modification of the invention.

In the illustration given in Figs. 1 to 4 inclusive, I provide a handle 10, to which there is rigidly secured a depending frame bar 11. The handle 10 is provided at its top with a longitudinally-extending slot 12. A pivot pin 13 extends through the sides of the handle and through the upper portion of the slot and carries a clamping member 14. The depending bar 11 is preferably anchored within a ring member 15 which extends about the forward end of the handle 10 and has depending legs 16 receiving the bar 11.

A saw rail support 17 is slidably received within the longitudinal slot of the handle and in a position to rock therein, as illustrated in Fig. 3. The lower edge of the rail 17 is adapted to rock upon the forward edge portion 18 of the handle when the rear end of the rail 17 is depressed by the clamping member 14, having an enlarged lower end.

The rail 17 may be provided with a plurality of permanent or removable pins 19, which are secured to the lower end of the rail 17 and which serve to lock the rail against rearward movement when in engagement with the handle portion 18.

The forward end of the rail 17 is provided with a pin 20 adapted to receive the opening in the upper end of the saw blade 21.

The bar 11 is provided at its lower end with a pin or stud 22 adapted to engage an opening in the lower end of the saw blade 21.

Above the pin 22 I prefer to equip the bar 11 with a stud 23 having a circumferential groove receiving the keeper or retainer 24. The retainer 24 is preferably provided with a hook-like lower end 25 which has an inner side abutting the upper end of the saw blade 21, as illustrated in Figs. 1 and 2, and which thus serves to maintain the blade in a flat condition, and thus against distortion, when great pressure is placed upon the blade to draw it taut.

In the operation of the structure shown in Figs. 1 to 4, inclusive, the rail 17 is placed in position, as illustrated in Fig. 3, the two ends of the blade 21 are brought into interlocking engagement with the pins 20 and 22, and then the keeper 24 is swung to the locking position shown in Figs. 1 and 2. If desired, the keeper may be swung in the opposite direction so that the lower end thereof engages the blade 21 at a point on the upper side of the pin 22. In either position, the keeper grips the flat blade and maintains it in a flattened condition against the bar 11 so that no distortion or twisting thereof occurs when the blade is drawn to a highly taut condition.

In the structure shown in Fig. 5, the rail 17 is the same as the rail shown in Figs. 1 to 4, inclusive, but the end of the rail is received within a flattened tube 26, the tube 26 having its closed end welded to a depending bar 27. The bar 27 is provided at its lower end with a pin 28 and with a second pin 29 carried by a bottom flange 30 which extends outwardly at right angles to the bar 27.

Similarly, the bar 11a is provided at its bottom with a flange 31 which extends outwardly at right angles to the bar 11a and a vertically-extending pin 32 is carried by the flange 31. A keeper 24 is mounted upon a stud 23 and is substantially identical with the keeper shown in Figs. 1 to 4, inclusive. The keeper 24 is provided with a horizontally-extending foot 33 which extends over and locks the saw blade 21 when it is supported in a horizontal position on the flanges 30 and 31 and has its end openings in engagement with the pins 29 and 32. Thus the keeper 24 maintains the saw blade, when in said horizontal position, in a flat condition against the flanges 30 and 31. Similarly, when the blade is mounted in a vertical position with its end openings receiving the pins 28 and 22, the flat side of the keeper is effective in maintaining the blade against distortion when the clamp 14 is moved to locking position.

In the structure shown in Figs. 6 to 8, inclusive, I provide means for employing a single plane rail 34 having no pins or indentations therein. The rail may consist of a single plane shaft having no irregularities therein, and the shaft may be cut to any desired length or lengths.

The handle 35 is provided with a longitudinal slot for receiving the rail 34 and also with a recess for receiving the depending bar 36, and the upper end of the bar may be spot welded at 37 within the recess of the handle. The handle is preferably provided with a raised portion at 38 and a pin 39 is extended through the spaced walls and carries the presser member 40. The presser member 40 is provided with extensions 41 and with a rearwardly-extending loop handle portion.

I extend a loop member 42 around the rail 34 and clamp it securely to the rail by a bolt 43, as shown more clearly in Fig. 8. By swinging the presser member 40 from the vertical position shown in Fig. 7 to the horizontal position shown in Fig. 6, the rail 34 is thrust outwardly for exerting tension upon the saw blade 44.

The depending bar 36 is provided at its lower end with a pin 45 for receiving the opening at the lower end of the blade 44 and a keeper 24 is employed for maintaining the blade in a flat condition when tension is exerted thereon.

At the outer end of the rail 34 I provide an end-piece 46 having a socket receiving the forward end of the rail 34 and having a pin 47 extending laterally from its forward end. I also provide a guard 48 which is adapted to hold the upper end of the blade flat against the opposite wall of the end-piece 46, as illustrated in Fig. 6.

In the operation of the structure shown in Figs. 6 to 9, inclusive, I insert a rail 34 through the longitudinal slot of the handle and between the raised side portions 38 of the handle. The U-shaped member 42 is clamped in the desired position upon the rail 34 and the saw blade 44 is placed in position, as illustrated in Fig. 6. The keeper 24 is swung downwardly to secure the flattened end of the saw blade against the bar 36, and then the vertical handle 40, as shown in Fig. 7, is swung to the clamping position shown in Fig. 6. The presser extensions 41 of the lever 40 press the member 42 outwardly to place the blade 44 under great tension. Due to the guard 48 and the keeper member 24 which maintain the blade flat against the inner supporting walls, no distortion of the blade occurs under the heavy clamping force imposed.

For release of the blade, the lever 40 may be swung to the vertical position shown and the keeper 24 may be swung to the position shown in Fig. 7. The blade may then be removed and a longer or shorter blade substituted. Since the rail 34 is a plane rail, any desired length may be used and any length of saw blade may be thus employed. If it is desired to use the saw blade in a horizontal position, an end-piece such as the end-piece 26 (Fig. 5) may be employed. Similarly, as shown in Fig. 5, the blade may be supported in a horizontal or vertical position, as desired.

In Fig. 10, the bar 11b is provided with pins 22a and 32b pressed from the bar 11b and integral with the bar 11b.

The saw structures illustrated require a minimum of effort in the operation of them because the clamping member may be swung quickly to release or locking positions and similarly the end-pieces and keeper members are readily manipulatable to secure saws of any lengths thereon and in different desired positions.

While, in the foregoing specification, I have set forth specific structures in considerable detail for the purpose of illustrating my invention, it will be understood that such details of structure may be varied widely by those skilled in the art without departing from the spirit of my invention.

I claim:

1. A saw frame structure for releasably holding and tensioning a saw blade, comprising a handle having a forwardly-extending upper portion slotted to receive a rail, a plane rail mounted in said slot and movable longitudinally of said handle, an end-piece having a socket receiving the outer end of said rail, a pin carried by said end-piece, a depending bar carried by the forward end of said handle, a pin carried by the lower end of said bar, an abutment member releasably secured to said rail, and a presser member having an intermediate portion thereof supported by a pivot upon said handle, whereby upon the movement of the presser member from vertical position to horizontal position, the forward portions thereof are pressed against said abutment member to move it outwardly for tensioning said saw blade.

2. A saw frame structure for releasably holding and tensioning a saw blade, comprising a handle having a forwardly-extending upper portion slotted to receive a rail, a plane rail mounted in said slot and movable longitudinally of said handle, an end-piece having a socket receiving the outer end of said rail, a pin carried by said end-piece, a depending bar carried by the forward end of said handle, a pin carried by the lower end of said bar, an abutment member releasably secured to said rail, and a presser member having an intermediate portion thereof supported by a pivot upon said handle, whereby upon the movement of the presser member from vertical position to horizontal position, the forward portions thereof are pressed against said abutment member to move it outwardly for tensioning said saw blade, said end-piece having also a guard portion spaced from the pin supporting portion of said end-piece and for receiving the saw blade therebetween.

3. A saw frame structure for releasably holding and tensioning a saw blade, comprising a handle having a forwardly-extending portion provided with a longitudinal slot, a rail slidably mounted in said slot, an abutment member releasably clamped to said rail, a presser member pivotally mounted upon said handle and having an extension engageable with said abutment member to move said rail outwardly from said handle, an end-piece having a slot receiving the forward end of said rail, a pin carried by the outer end of said end-piece for engaging an opening in an end of said saw blade, a depending bar secured to the forward portion of said handle, a pin carried by the lower end of said bar for engaging an opening in the other end of said saw blade, and a keeper member pivotally mounted upon said depending bar and swingable into engagement with the adjacent end of said saw blade to hold it in flat condition against said bar, when the opening in said adjacent end of said saw blade is received on the pin carried by the lower end of said bar.

MARTIN S. SWANSTROM.

References Cited in the file of this patent

UNITED STATES PATENTS

| Number | Name | Date |
|---|---|---|
| 330,104 | Fornander | Nov. 10, 1885 |
| 382,808 | Hathaway | May 15, 1888 |
| 650,913 | Saxton | June 5, 1900 |
| 704,893 | Martin | July 15, 1902 |
| 1,091,404 | Tilden | Mar. 24, 1914 |
| 1,406,422 | Siddon | Feb. 14, 1922 |
| 1,424,378 | Remington | Aug. 1, 1922 |
| 1,429,195 | Donaldson | Sept. 12, 1922 |

FOREIGN PATENTS

| Number | Country | Date |
|---|---|---|
| 548,625 | France | Oct. 28, 1922 |
| 579,058 | France | July 22, 1924 |
| 125,458 | Australia | Sept. 25, 1947 |